(12) United States Patent
Bakx

(10) Patent No.: US 8,023,373 B2
(45) Date of Patent: Sep. 20, 2011

(54) DISC DRIVE AND PHOTO-DETECTOR CIRCUITS

(75) Inventor: Johannes Leopoldus Bakx, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 271 days.

(21) Appl. No.: 12/305,038

(22) PCT Filed: Jun. 25, 2007

(86) PCT No.: PCT/IB2007/052448
§ 371 (c)(1),
(2), (4) Date: Dec. 16, 2008

(87) PCT Pub. No.: WO2008/001298
PCT Pub. Date: Jan. 3, 2008

(65) Prior Publication Data
US 2009/0274023 A1 Nov. 5, 2009

(30) Foreign Application Priority Data
Jun. 26, 2006 (EP) .................................. 06116046

(51) Int. Cl.
*G11B 5/00* (2006.01)

(52) U.S. Cl. ................. 369/47.5; 369/44.29; 369/44.35; 369/44.36; 369/53.28

(58) Field of Classification Search ............... 369/47.5, 369/44.29, 53.28, 44.35, 44.36
See application file for complete search history.

(56) References Cited

U.S. PATENT DOCUMENTS

| 4,901,031 A * | 2/1990 | Kalthoff et al. ............... 330/253 |
| 5,146,443 A * | 9/1992 | Iwase et al. ............... 369/44.29 |
| 7,251,206 B2 * | 7/2007 | Baek et al. .................... 369/53.2 |
| 7,369,467 B2 * | 5/2008 | Kim et al. ................... 369/44.37 |
| 2005/0105414 A1 | 5/2005 | Nagara et al. |
| 2005/0237882 A1 | 10/2005 | Honobe |

FOREIGN PATENT DOCUMENTS

| EP | 0446412 A2 | 9/1991 |
| EP | 1453049 A2 | 9/2004 |
| EP | 1528543 A2 | 5/2005 |
| JP | 06096449 A | 4/1994 |

OTHER PUBLICATIONS

SIPEX Advanced SP8059, Rev 0.7e (May 17, 2005) SP8059 Ten-Channel Photo detector IC, Downloaded from http://www.sipex.com/Files/DataSheets/SP8059.pdf on Apr. 5, 2006.
Brasca G. et al: "A CD analog front-end in BiCMOS technology" Solid-State Circuits Conference, Esscirc, Proceedings of the 24th European the Hague, The Netherlands Sep. 22-24, 1998, Piscataway, NJ, USA, IEEE, Sep. 22, 1998, pp. 220-223, XP010823457 ISBN: 2-86332-235-4.

* cited by examiner

*Primary Examiner* — Wayne Young
*Assistant Examiner* — Brenda Bernardi

(57) ABSTRACT

A method of reducing power dissipation in a variable-gain photo-detector circuit is described. The variable-gain photo-detector circuit has an output to output a main spot signal and at least one side spot signal. The main spot (M) and the side spot (Si or S2) are formed by separating a light beam into a main beam and at least one side beam and focusing the main beam on the main spot (M) and the side beam on at least one side spot (Si or S2) on an optical record carrier The method processes the main spot signal with a first averaging circuit having a first cut-off frequency. The side spot signal is processed with a second averaging circuit having a second cut-off frequency. The second cut-off frequency is lower than the first cut-off frequency. The above technique reduces power dissipation in the variable-gain photo-detector circuit and is useful for all optical devices.

13 Claims, 3 Drawing Sheets

DISC DRIVE AND PHOTO-DETECTOR CIRCUITS

FIELD OF THE INVENTION

The invention relates to the field of optical disc drives, and more specifically to photo-detector circuits of optical disc drives.

BACKGROUND OF THE INVENTION

Toru et. al (EP1528543) disclose an optical disk apparatus that includes a photo-detector circuit, wherein a main spot and a side spot output signal from the photo-detector circuit are sampled while recording data on an optical record carrier. Generally, this sampling requires high-speed processing of the sampled signals. This increases the power dissipation in the photo-detector circuit.

It would be advantageous to have a method for reducing power dissipation in a photo-detector circuit. It would also be advantageous to have a photo-detector circuit that dissipates less power. It would also be advantageous to have a disc drive that dissipates less power.

SUMMARY OF THE INVENTION

A method of reducing power dissipation in a variable-gain photo-detector circuit is described here. The variable-gain photo-detector circuit has an output to output a main spot signal and at least one side spot signal. The main spot and the side spot are formed by separating a light beam into a main beam and at least one side beam and focusing the main beam on the main spot and the side beam on at least one side spot on an optical record carrier. The method processes the main spot signal with a first averaging circuit having a first cut-off frequency. The side spot signals are processed with a second averaging circuit having a second cut-off frequency. The second cut-off frequency is lower than the first cut-off frequency.

A variable-gain photo-detector circuit is described here. It has an output to output a main spot signal and a side spot signal. The main spot and the side spot are formed by separating a light beam into a main beam and at least one side beam and focusing the main beam on the main spot and the side beam on at least one side spot on an optical record carrier. It includes a first averaging circuit arranged to process the main spot signal using a first cut-off frequency. It includes a second averaging circuit arranged to process the side spot signal using a second cut-off frequency. The second cut-off frequency is lower than the first cut-off frequency.

In a disc drive described herein, an optical system scans tracks of an optical record carrier. The optical system has a light generator that generates a light beam; a lens system for separating a light beam into a main beam and at least one side beam; and a focusing unit for focusing the main beam on the main spot and the side beam on at least one side spot on the optical record carrier. The disc drive includes the variable-gain photo-detector circuit as described in the previous paragraph.

BRIEF DESCRIPTION OF DRAWINGS

These and other aspects, features and advantages will be further explained by the following description, by way of example only, with reference to the accompanying drawings, in which same reference numerals indicate same or similar parts, and in which:

FIG. 1 schematically illustrates one example of a disc drive 1 (e.g. Blu-ray drive), suitable for writing information on to an optical record carrier 2 (typically a Blu-ray disc). For rotating the optical record carrier 2, the disc drive 1 has a motor 4. The motor is typically fixed to a frame defining a rotation axis 5. For receiving and holding the optical record carrier 2, the disc drive 1 may consist of a turntable or clamping hub 6, which in the case of a spindle motor 4 is mounted on the spindle axis 7 of the motor 4. The disc drive 1 is generally used for recording/reading data from the optical record carrier 2.

Figure 1:
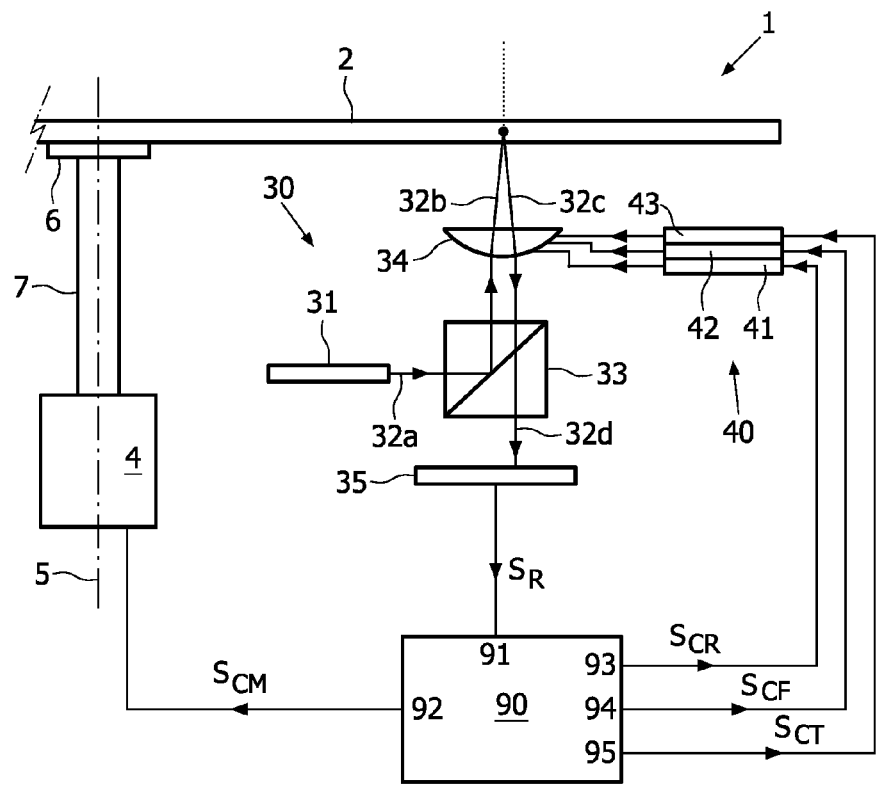
FIG. 1 schematically illustrates a disc drive.

Optical record carrier 2 can be a Recordable (R) or Rewritable (RW) type where information may be stored or recorded, such as CD-R, CD-RW, DVD+RW, DVD-RW, DVD+R, BD-RE.

The disc drive 1 has an optical system 30 for scanning tracks of the optical record carrier 2 by an optical beam. More specifically, the optical system 30 has a light generator 31 (e.g. laser diode), arranged to generate a light beam 32a. The light beam 32a passes through a beam splitter 33 and an objective lens 34. The objective lens 34 focuses the light beam 32b on the optical record carrier 2. The light beam 32b reflects from the optical record carrier 2 (reflected light beam 32c) and passes through the objective lens 34 and the beam splitter 33 (beam 32d) to reach an optical detector 35.

For achieving and maintaining the correct focusing of the light beam 32b on a desired location (on the optical record carrier 2), the objective lens 34 is mounted so as to be axially displaceable. Further, the actuator system 40 of the disc drive 1 includes the following:

1. a radial actuator 41 for controlling the radial position of the objective lens 34;
2. a focus actuator 42 for axially displacing the objective lens 34 with respect to the recording reference plane of the optical record carrier 2; and
3. a tilt actuator 43 for pivoting the objective lens 34 with respect to the optical record carrier 2.

It is further noted that the radial actuator 41, the focus actuator 42, and the tilt actuator 43 may be implemented as one integrated 3D-actuator.

The disc drive 1 has a control circuit 90 having a first output 92 coupled to a control input of the motor 4, a second output 93 coupled to a control input of the radial actuator 41, a third output 94 coupled to a control input of the focus actuator 42, and a fourth output 95 coupled to a control input of the tilt actuator 43. The control circuit 90 is designed to generate the following:

1. at its first output 92, a control signal $S_{CM}$ for controlling the motor 4;
2. at its second output 93, a control signal $S_{CR}$ for controlling the radial actuator 41;
3. at its third output 94, a control signal $S_{CF}$ for controlling the focus actuator 42; and
4. at its fourth output 95, a control signal $S_{CT}$ for controlling the tilt actuator 43.

The control circuit 90 further has a read signal input 91 for receiving a read signal $S_R$ from the optical detector 35.

Figure 2:
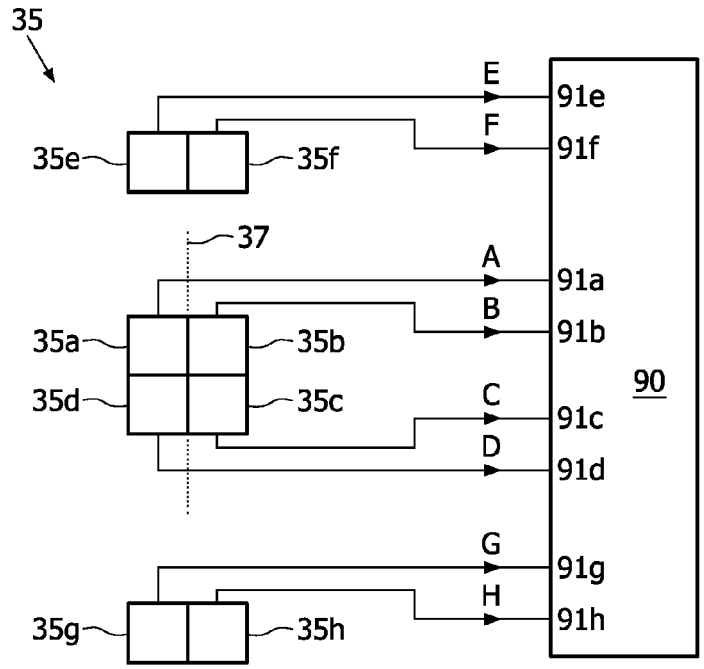
FIG. 2 is a block diagram showing an example of a variable-gain photo-detector circuit.

FIG. 2 illustrates that the variable-gain photo-detector circuit 35 (i.e. the optical detector) comprises a plurality of detector segments, in this case four detector segments, 35a, 35b, 35c and 35d, capable of providing individual detector signals A, B, C, and D, indicating the amount of light incident on each of the four detector quadrants, respectively. A centerline 37 separates the first and fourth segments 35a and 35d from the second and third segments 35b and 35c. Furthermore, the variable-gain photo-detector circuit 35 comprises two detector segments 35e and 35f capable of providing individual detector signals E and F, indicating the amount of light incident on each of the detector segments (i.e. 35e and 35f). Furthermore, the variable-gain photo-detector circuit 35 comprises two detector segments 35g and 35h capable of providing individual detector signals G and H, indicating the amount of light incident on each of the detector segments (i.e. 35g and 35h). FIG. 2 also illustrates that the read signal input 91 of the control circuit 90 has four inputs 91a, 91b, 91c, and 91d for receiving the individual detector signals A, B, C, and D, respectively. Furthermore, the read signal input 91 of the control circuit 90 has four inputs 91e, 91f, 91g, and 91h for receiving the individual detector signals E, F, G and H respectively. Data and control information is derived from the individual detector signals as will be clear to a person skilled in the art. For instance, a data signal, a tracking signal and a focus error signal can generally be obtained as follows, Data=$(A+B+C+D)$ Tracking=$[(A+D)-(B+C)]-k[(E+G)-(F+H)]$, where k is a multiplication factor, Focus=$(A+C)-(B+D)$ Push-pull methods and three beam methods have generally been employed as servo tracking methods for recording data on the optical record carrier. Among the methods, a typical one is a differential push-pull method.

Figure 3A:
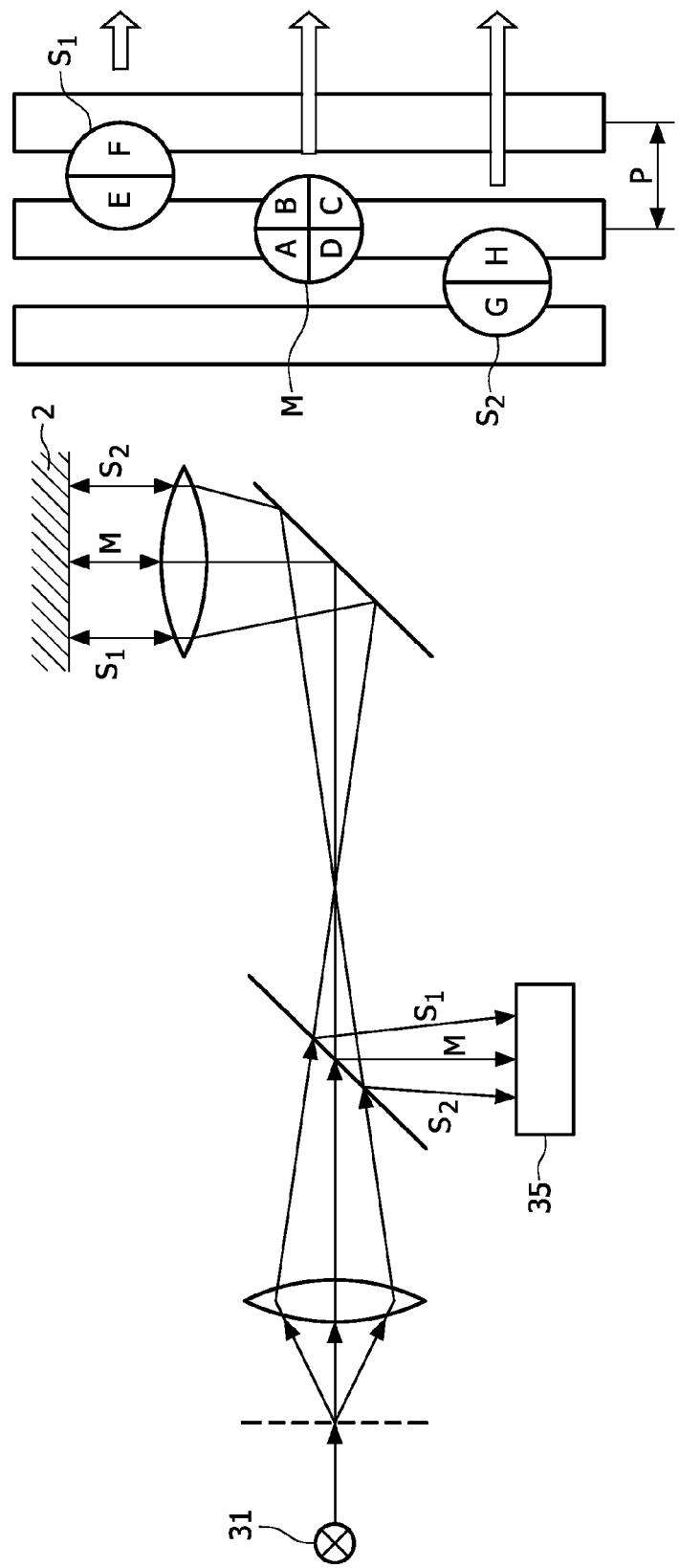
FIGS. 3A-3C are schematic illustrations of the positional relationship between a main spot and a side spot in a differential push-pull method.

The principle of differential push-pull method is schematically illustrated in FIG. 3A. A light beam generated by the light generator 31 is separated into a main beam and side beams. The main beam is focused into the main spot M and the side beam is focused into the side spots $S_1$ and $S_2$ on the optical record carrier 2. The three light beam spots (a main spot M and side spots $S_1$ and $S_2$) formed by the optical system are positioned so that the side spots $S_1$ and $S_2$ are shifted with respect to the main spot M by half of a track pitch P (as shown in FIG. 3A). Further, as shown in FIG. 3A, the main spot M is formed by the light receiving areas A to D; the side spot $S_1$ is formed by the light receiving areas E and F; and the side spot $S_2$ is formed by the light receiving areas G and H on the optical record carrier 2. Reflected light beams from the main spot M and the side spots $S_1$ and $S_2$ are photo-electrically converted by the variable-gain photo-detector circuit 35 so that push-pull signals can be obtained for the spots M, $S_1$ and $S_2$. The photo-electrically converted signals are used to obtain data and servo signals, such as radial, focus and tilt control signals, that are required by the disc drive 1. It is to be noted that "main spot" here refers to the central spot or primary spot and "side spot" refers to satellite spots or sub-spots or secondary spots. Further, the optical system 30 of the disc drive 1 can be suitably modified to form the main spot M and the side spots $S_1$ and $S_2$.

Figure 3B:
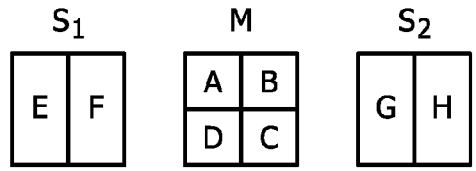
Figure 3C:
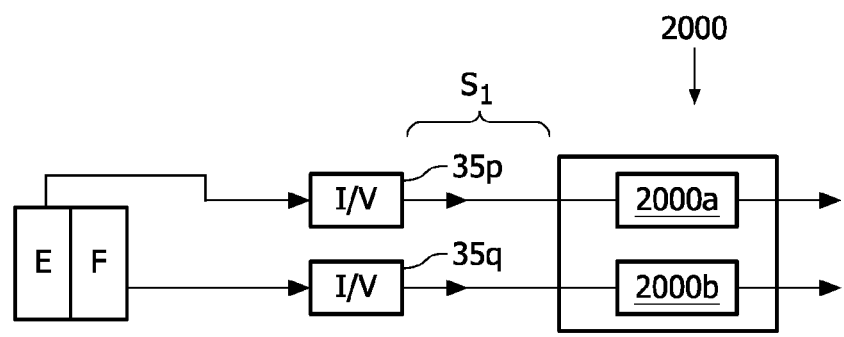
Figure 3C:
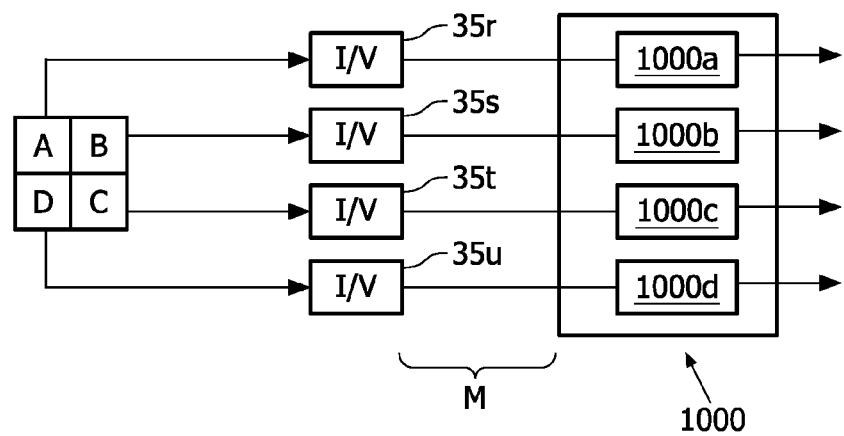
Figure 3C:
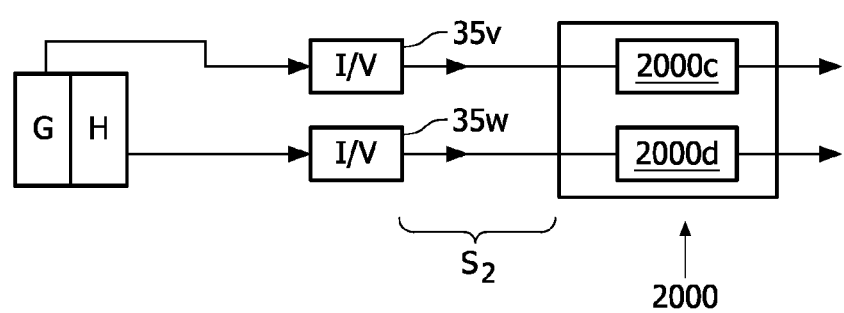

FIG. 3B shows photo-receiving areas A to H for receiving portions of the main spot M and the side spots $S_1$ and $S_2$. Reflected beams are converted into corresponding currents in the photo-receiving areas A to H and are further converted into voltage signals by current-voltage conversion units. The number of configurations is four for the main spot M and four for the side spots $S_1$ and $S_2$. Therefore, there are 8 current voltage converters 35p-35w, as shown in FIG. 3C. Alternatively, in another implementation, the photo-receiving areas for the side spots $S_1$ and $S_2$ could each be divided into four areas, so that a total of 12 areas are present (i.e. the 12-segment focusing method).

One example of a variable-gain photo-detector circuit 35 is a ten-channel photo-integrated circuit SP8059 from SIPEX. SP 8059 is designed for a new generation of Blu-ray, DVD and CD applications. It can operate at wavelengths of 405, 650 and 780 nm and is suitable for 4× Blu-ray Read/Write, 16× DVD Read/Write and 48× CD Read/Write.

DETAILED DESCRIPTION OF EMBODIMENTS

Generally, in a disc drive 1 the main spot and the side spot output signals from the photo-detector circuit are sampled while recording data on the optical record carrier 2. This involves sampling the detected signals during write at an appropriate moment, e.g. for CD-R media at the end of the bias level (read level). One of the problems with the sampling method is that it generally requires high-speed processing of the sampled signals. The transient time after a write pulse should be sufficiently short to allow sampling at a sufficient number of run lengths. This means that all 8 or 12 segment signals of the photo-detector circuit require high-speed processing. This increases the power dissipation in the photo-detector circuit.

Accordingly, a method of reducing power dissipation in a variable-gain photo-detector circuit 35 is described. The variable-gain photo-detector circuit has an output to output a main spot signal and at least one side spot signal. The main spot M and the side spot $S_1$ or $S_2$ are formed by separating a light beam into a main beam and at least one side beam and focusing the main beam on the main spot M and the side beam on at least one side spot $S_1$ or $S_2$ on the optical record carrier 2. The method comprises processing the main spot signal with a first averaging circuit 1000 having a first cut-off frequency; and processing the side spot signal with a second averaging circuit 2000 having a second cut-off frequency. The second cut-off frequency is lower than the first cut-off frequency.

The first averaging circuit 1000 and the second averaging circuit 2000 are shown in FIG. 3c. The first averaging circuit 1000 and the second averaging circuit 2000 may be implemented as low-pass filter circuits. The low-pass filter circuit smoothens (integrates) rapid changes. It allows slowly varying signals to pass unimpeded.

The first averaging circuit 1000 is designed to operate at a first cut-off frequency and comprises:
1. Circuits 1000a-1000d arranged to average the main spot signal formed from the light receiving areas A to D.

The second averaging circuit 2000 is designed to operate at a second cut-off frequency, the second cut-off frequency being lower than the first cut-off frequency. The second averaging circuit 2000 comprises:
1. Circuit 2000a and circuit 2000b arranged to average the side spot signal formed from the light receiving areas E and F; and
2. Circuit 2000c and circuit 2000d arranged to average the side spot signal formed from the light receiving areas G and H.

In an embodiment, the second averaging circuit 2000 (i.e. the circuits 2000a, 2000b, 2000c and 2000d) is realized using transistors. These transistors are operated by applying a low bias current, which automatically implies low bandwidth and low power dissipation. The bias current is set low. This reduces the power dissipation in the corresponding circuitry and therefore the power dissipation in the photo-detector circuit. Only a servo signal needs to be detected from the side spot signal and hence low bandwidth is sufficient. For example, the main spot signal uses a bandwidth of 100 MHz. The bandwidth of the side spot signal can be a fraction of the bandwidth of the main spot signal, e.g. 1 MHz.

In a further embodiment, the second averaging circuit 2000 (i.e. the circuits 2000a, 2000b, 2000c and 2000d) is realized using large-area transistors. The large-area transistors inherently have a relatively low bandwidth. Furthermore, they have the advantage that they mutually match accurately (i.e. the circuits 2000a and 2000b used for processing the side spot signal $S_1$ can be matched with the circuits 2000c and 2000d used for processing the side spot signal $S_2$). The large-area transistors are operated at low current density, since the lower current density reduces power dissipation per unit area. The power dissipation in the photo-detector circuit is thus reduced.

Using the above embodiments, a power reduction of approximately 100-200 mW is generally possible for a 16× DVD photo-detector integrated circuit that uses 8 segments or 12 segments.

The method does not need any sampling of the main spot signal and the side spot signal. The four side spots may have a bandwidth that is generally a fraction of the bandwidth of the main spot signal. The bandwidth for processing the side spot signals is reduced to a value that is needed for servo purposes only, e.g. a bandwidth of 1 MHz is already sufficient. Otherwise a bandwidth of 100-150 MHz is needed to allow sampling at 16× DVD.

The method is carried out while recording data on the optical record carrier 2 (e.g. Blu-ray disc, CD, DVD) at a plurality of data recording speeds.

In a still further embodiment, a gain value of the photo-detector circuit is selected on the basis of a type of the optical record carrier 2 and the data recording speed. Optical record carriers (e.g. optical discs) are produced in many types (single and dual layer), such as CD-R, CD-RW, DVD+R, DVD+RW, BD-RE. The disc drive 1 has to support these different disc types at different recording speeds, such as 1×, 2×, ... 8× etc. The photo-detector circuit has to cater to: i) different types of optical discs ii) different recording speeds and iii) different reflectivity values. Different disc types are made up of different materials, have different physical aspects of width and depth of the track, have different reflectance values, and the quantity of reflected light varies between these different types of discs. Hence, the photo-detector circuit allows a range of gain values. Appropriately selecting the gain value on the basis of disc type, write speed, and variations in data write conditions ensures that the detector signals generally never saturate.

In a still further embodiment, the main spot signal and the side spot signal is normalized. Normalization has the advantage that the signals after processing, such as the wobble signal and the servo signals, do not change significantly in amplitude at read-write transition. Normalization generally can be achieved by dividing the output signal by a sum signal that represents the total power in the spot.

Generally, the photo-detector integrated circuits available on the market have high-speed channels to output the main spot signals, and slow-speed channels to output the side spot signals. The disclosed method generally reduces the number of high-speed channels in the photo-detector circuit so that a substantial power reduction is achieved. The photo-detector circuit includes a first averaging circuit 1000 arranged to process the main spot signal using a first cut-off frequency; and a second averaging circuit 2000 arranged to process the side spot signals using a second cut-off frequency, the second cut-off frequency being lower than the first cut-off frequency.

In an embodiment, the second averaging circuit 2000 is realized using transistors capable of being operated by a low bias current.

In a further embodiment, the second averaging circuit 2000 is realized using large-area transistors.

Furthermore, the disc drive 1 includes the variable-gain photo-detector circuit 35, as described in the embodiments. The disc drive 1 can be a Blu-ray drive, CD drive or DVD drive capable of recording data.

Generally, in a disc drive 1 the main spot signal and the side spot signal from the photo-detector integrated circuit are sampled while recording data on the optical record carrier 2. This involves sampling the detected signals during write at an appropriate moment, e.g., for CD-R media at the end of the bias level (read level). The advantage of sampling is that the signal range after sampling is much smaller than the range after averaging. For example in the case of CD-R, the sampled level during write is similar to the level during read, so that not much gain switching is required when switching from read to write mode or vice-versa. Hence, generally the optical drives use the sampling method. As discussed, the sampling method requires high-speed processing of the sampled signals and hence high-speed circuits. The high-speed circuit increases the power dissipation in the photo-detector circuit. The embodiments disclosed reduce the power dissipation in the photo-detector circuit and require low-speed circuits.

It is possible to have a variable-gain photo-detector circuit that has both a high-speed circuit (i.e. a circuit that uses sampling and dissipates more power) and a low-speed circuit (i.e. a circuit that uses averaging as disclosed in the embodiments and reduces power dissipation). In such a scenario, the application has to decide which one to use (i.e. high-speed circuit or low-speed circuit). Further, the circuits that are not used can generally be disabled.

In essence, only a servo signal needs to be detected from the side spot signals and hence a low bandwidth is sufficient for processing the side spot signals. The idea is to use an averaging method on all discs and at all speeds while recording data on the optical record carrier. This implies that no high-speed sampling is needed. The main spot signal is processed with a first averaging circuit having a first cut-off frequency. The side spot signals are processed with a second averaging circuit having a second cut-off frequency. The second cut-off frequency is lower than the first cut-off frequency. The second averaging circuit for processing the side spot signals has a low bandwidth and uses a low bias current, thereby reducing power dissipation in the photo-detector circuit.

Although the invention has been explained by embodiments using 8-segment photo-detector circuits, it is also applicable for 12-segment photo-detector circuits. In the embodiments, the disc drive is capable of recording data. However, the disc drive may perform at least an operation from among the following: recording, reproducing and erasing. A person skilled in the art can implement the described embodiments in software or in both hardware and software. Other variations to the disclosed embodiments can be understood and effected by those skilled in the art of practicing the claimed invention, from a study of the drawings, the disclosure and the appended claims. The use of the verb "comprise" does not exclude the presence of elements other than those stated in a claim or in the description. The use of the indefinite article "a" or "an" preceding an element or step does not exclude the presence of a plurality of such elements or steps. Any reference sign in the claims should not be construed as limiting. The Figures and description are to be regarded as illustrative only and do not limit the invention.

In summary, a method of reducing power dissipation in a variable-gain photo-detector circuit is described. The variable-gain photo-detector circuit has an output to output a main spot signal and at least one side spot signal. The main spot M and the side spot $S_1$ or $S_2$ are formed by separating a light beam into a main beam and at least one side beam and focusing the main beam on the main spot M and the side beam on at least one side spot $S_1$ or $S_2$ on an optical record carrier. The method processes the main spot signal with a first averaging circuit having a first cut-off frequency. The side spot signal is processed with a second averaging circuit having a second cut-off frequency. The second cut-off frequency is lower than the first cut-off frequency.

The invention claimed is:

1. A method of reducing power dissipation in a variable-gain photo-detector circuit (35) of a servo-tracking system, the variable-gain photo-detector circuit having an output to output a received main spot signal and at least one received side spot signal, the main spot signal and the side spot signal being formed by separating a light beam into a main beam and at least one side beam and focusing the main beam onto a main spot (M) and the at least one side beam onto a corresponding side spot (Si or S2) on an optical record carrier, the method comprising:
processing the received main spot signal with a first averaging circuit (1000) having a first cut-off frequency; and
processing the received at least one side spot signal with a corresponding second averaging circuit (2000) having a second cut-off frequency, the second cut-off frequency being lower than the first cut-off frequency and based on control signal characteristics of the servo-tracking system.

2. The method of claim 1, wherein processing the side spot signal with the second averaging circuit (2000) comprises driving transistors with a low bias current.

3. The method of claim 1, wherein processing the side spot signal using the second averaging circuit (2000) comprises driving large-area transistors.

4. The method of claim 1, wherein the method is performed while recording data on the optical record carrier (2) at a plurality of data recording speeds.

5. The method of claim 1, wherein the method further comprises selecting a gain value of the variable-gain photo-detector circuit (35) on the basis of a type of the optical record carrier (2) and the data recording speed.

6. The method of claim 1, wherein the method further comprises normalizing the main spot signal and the side spot signal.

7. The method of claim 1, wherein the method is performed on an 8-segment variable-gain photo-detector circuit or on a 12-segment variable-gain photo-detector circuit.

8. The method of claim 4, wherein recording data on the optical record carrier comprises:
recording data on a blu-ray disc or a DVD or a CD.

9. A variable-gain photo-detector circuit (35) within a disc tracking system, comprising:
means for separating a light beam into a main beam and at least one side beam and focusing the main beam onto a main spot (M) and the side beam onto at least one side spot (Si or S2) on an optical record carrier, the variable-gain photo-detector circuit comprising:
a first averaging circuit (1000) arranged to process a received main spot signal using a first cut-off frequency; and
a second averaging circuit (2000) arranged to process a received side spot signal using a second cut-off frequency, the second cut-off frequency being lower than the first cutoff frequency and based on control signal characteristics of the disc-tracking system.

10. The variable-gain photo-detector circuit (35) of claim 9, wherein the second averaging circuit (2000) arranged to process the side spot signal comprises transistors capable of being driven by a low bias current.

11. The variable-gain photo-detector circuit (35) of claim 9, wherein the second averaging circuit (2000) arranged to process the side spot signal comprises large-area transistors.

12. A disc drive (1) comprising:
an optical system (30) for scanning tracks of an optical record carrier (2), said optical system comprises:
a light generator (31) arranged to generate a light beam,
a lens system for separating the light beam into a main beam and at least one side beam,
a focusing unit for focusing the main beam onto a main spot (M) and the side beam onto at least one side spot (Si or S2) on the optical record carrier (2);
a control unit for driving the lens system and the focusing unit; and
a variable-gain photo-detector circuit (35) comprising:
an output to output a signal received from the main spot and a signal from corresponding ones of the at least one side spot,
a first averaging circuit (1000) arranged to process the signal received from the main spot using a first cut-off frequency; and
a second averaging circuit (2000) arranged to process the signal received from the corresponding second spot using a second cut-off frequency, the second cut-off frequency being lower than the first cut-off frequency and based on control signal characteristics of the control unit.

13. The disc drive of claim 12, wherein the disc drive is a Blu-ray drive, a DVD drive or a CD drive.

* * * * *